US009684789B2

(12) United States Patent
Jaber et al.

(10) Patent No.: US 9,684,789 B2
(45) Date of Patent: Jun. 20, 2017

(54) ARBITRARY CODE EXECUTION AND RESTRICTED PROTECTED STORAGE ACCESS TO TRUSTED CODE

(71) Applicant: DELL PRODUCTS, LP, Round Rock, TX (US)

(72) Inventors: Muhammed K. Jaber, Austin, TX (US); Quy N. Hoang, Round Rock, TX (US); Shawn J. Dube, Austin, TX (US); Theodore S. Webb, III, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/212,807

(22) Filed: Jul. 18, 2016

(65) Prior Publication Data
US 2016/0328565 A1    Nov. 10, 2016

Related U.S. Application Data

(63) Continuation of application No. 13/596,558, filed on Aug. 28, 2012, now Pat. No. 9,396,335.

(51) Int. Cl.
G06F 21/00    (2013.01)
G06F 21/57    (2013.01)
H04L 9/32    (2006.01)
H04L 29/06    (2006.01)

(52) U.S. Cl.
CPC .......... *G06F 21/575* (2013.01); *H04L 9/3247* (2013.01); *H04L 63/045* (2013.01); *H04L 63/061* (2013.01)

(58) Field of Classification Search
USPC ........................................ 713/171
See application file for complete search history.

(56) References Cited

U.S. PATENT DOCUMENTS

| 6,782,477 | B2 * | 8/2004 | McCarroll | G06F 21/51 |
| | | | | 713/176 |
| 7,260,848 | B2 | 8/2007 | Zimmer | |
| 7,822,978 | B2 | 10/2010 | Young et al. | |
| 7,827,371 | B2 | 11/2010 | Yao et al. | |
| 8,001,581 | B2 | 8/2011 | Ford et al. | |
| 8,219,792 | B2 * | 7/2012 | Jaber | G06F 21/335 |
| | | | | 713/1 |
| 2002/0053008 | A1 * | 5/2002 | Goodman | G06F 11/1417 |
| | | | | 711/162 |
| 2002/0099949 | A1 * | 7/2002 | Fries | G06F 21/575 |
| | | | | 726/24 |
| 2003/0188176 | A1 * | 10/2003 | Abbondanzio | G06F 21/575 |
| | | | | 713/191 |
| 2003/0196110 | A1 * | 10/2003 | Lampson | G06F 9/4406 |
| | | | | 726/30 |
| 2004/0006680 | A1 * | 1/2004 | Duncan | G06F 7/58 |
| | | | | 711/219 |

(Continued)

OTHER PUBLICATIONS

Ashkenazi, Asaf. "Security Features in the i. MX31 and i. MX31L Multimedia Applications Processors." Freescale Semiconductor, Online (2005).

*Primary Examiner* — Harris C Wang
(74) *Attorney, Agent, or Firm* — Larson Newman, LLP

(57) ABSTRACT

A method comprises signing boot code with a public/private cryptographic key pair, and writing to storage the boot code, the public cryptographic key, and the signed boot code.

20 Claims, 4 Drawing Sheets

(56) References Cited

U.S. PATENT DOCUMENTS

| | | |
|---|---|---|
| 2005/0071677 A1 | 3/2005 | Khanna et al. |
| 2005/0154898 A1* | 7/2005 | Chao .................... G06F 21/445 |
| | | 713/185 |
| 2005/0262361 A1* | 11/2005 | Thibadeau .............. G06F 21/80 |
| | | 713/193 |
| 2011/0093689 A1 | 4/2011 | Pant et al. |
| 2013/0282951 A1* | 10/2013 | Kuo .................... G06F 21/575 |
| | | 711/102 |
| 2014/0068238 A1* | 3/2014 | Jaber .................... G06F 21/575 |
| | | 713/2 |

* cited by examiner

ARBITRARY CODE EXECUTION AND RESTRICTED PROTECTED STORAGE ACCESS TO TRUSTED CODE

CROSS REFERENCE TO RELATED APPLICATION

This application is a continuation of U.S. patent application Ser. No. 13/596,558, entitled "Arbitrary Code Execution and Restricted Protected Storage Access to Trusted Code," filed on Aug. 28, 2012, the disclosure of which is hereby expressly incorporated by reference in its entirety.

FIELD OF THE DISCLOSURE

This disclosure generally relates to information handling systems, and more particularly relates to authentication and security of data on storage devices of information handling systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. Information handling systems may provide security for data stored on them.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
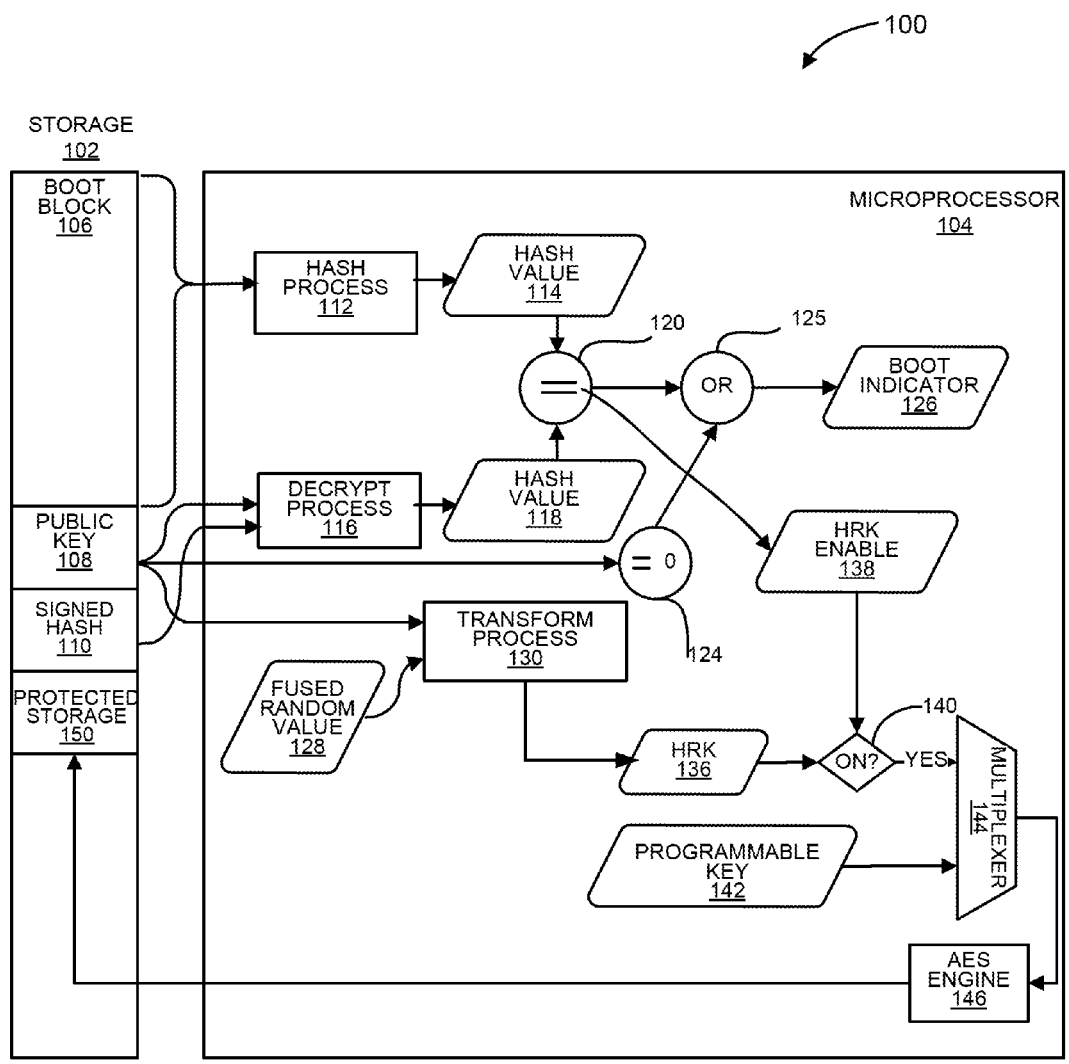
FIG. 1 illustrates a block diagram of an exemplary embodiment of an authentication system.

FIG. 1 shows an information handling system 100 that involves both digital signatures using asymmetric encryption and protected storage. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. An Information handling system can include memory, one or more processing resources such as a central processing unit (CPU) or hardware or software control logic. Additional components of information handling system can include one or more storage devices, one or more communications ports for communicating with external devices as well as various input and output (I/O) devices, such as a keyboard, a mouse, and a video display. Information handling system can also include one or more buses operable to transmit communications between the various hardware components.

System 100 includes storage 102 and microprocessor 104. Storage 102 includes boot block 106, public key 108, signed hash 110, and protected storage 150. Boot block 106 may contain code to boot microprocessor 104. Public key 108 and a private key may be a public/private pair of cryptographic keys used for signing and verifying data. Data signed by the private (signing) key may be verified by public (verification) key 108. Signed hash 110 purports to be the result of signing boot block 106 by the signing key. Signing the boot block 106 can be performed in several ways. For example the boot block 106 can be signed according to the US Digital Signature Standard FIPS 186-3. Protected storage 150 may contain passwords and other certificates or other sensitive data or information. The contents of protected storage 150 may be symmetrically encrypted by a cryptographic key for protection.

Microprocessor 104 includes hash process 112, hash value 114, decrypt process 116, hash value 118, evaluation 120, comparison 124, logical OR 125, boot indicator 126, transform process 130, hidden root key (HRK) 136, HRK Enable indicator 138, process 140, programmable key 142, multiplexer 144, and AES engine 146. The components of microprocessor 104 may enable the microprocessor to determine if booting from boot block 106 is authorized or authenticated, and may enable microprocessor 104 to generate a cryptographic key for accessing and modifying the data in protected storage 150. In one embodiment, microprocessor 104 is implemented in a baseboard management controller (BMC). The BMC may be a component of a server (not shown) and may be connected to the management workstation of the server via an Ethernet router to provide a single centralized management appliance for the server. The BMC may have an Internet Protocol (IP) address, enabling remote control of the BMC and, as a result, of the server. The BMC may, for example, consist of an Integrated Dell™ Remote Access Controller (iDRAC), such as iDRAC6 or iDRAC7. An iDRAC may provide for automatic encryption. In further embodiments, the iDRAC may be used to manage Dell servers, such as Dell™ PowerEdge™ 12$^{th}$ generation servers.

Storage 102 and microprocessor 104 may be connected by a serial peripheral interface (SPI). An SPI is a synchronous serial data link that operates in full duplex mode between a master device and a slave device. In this embodiment, storage 102 is a slave to microprocessor 104 in that the microprocessor initiates data frames to storage 102. In some embodiments multiple storages 102 are coupled as slaves to microprocessor 104. In most situations, storage 102 and microprocessor 104 are connected via a four-wire serial bus (not shown) that includes two control lines and two data lines. Typical devices that implement storage 102 include storage devices such as solid state or flash memory devices.

Components hash process 112, decrypt process 116, and evaluation 120 may determine if signed hash 110 is actually the result of signing boot block 106. If so, boot block 106 is said to be properly signed. Hash process 112 may hash data and decrypt process 116 may decrypt data using an asymmetric decryption process. Together, hash process 112 and decrypt process 116 may be used to test whether signed hash 110 is the result of signing boot block 106 with the private key; that is, whether signed hash 110 is a signature of boot block 106. To do so, hash process 112 hashes boot block 106 using the same hash process purportedly used to created signed hash 110, thereby producing hash value 114. Microprocessor 104 may also apply asymmetric decryption process 116 to decrypt signed hash 110 using public key 108, thereby generating hash value 118. Microprocessor 104 performs an evaluation 120 of hash value 114 and hash value 118 to determine if the hash values are equal to each other. Equality of the values indicates that signed hash 110 is indeed the result of signing boot block 106 with the private key. The result of evaluation 120 is stored in HRK Enable indicator 138. In one embodiment, storing a logical "1" in HRK Enable indicator 138 may indicate equality of values and storing a logical "0" may indicate that hash values 114 and 118 are not equal to each other.

In some embodiments, the results of evaluation 120 may be used to generate an alert that there was a failure to boot in secure mode. In many further embodiments, the boot may continue in an insecure mode. In other further embodiments, the boot may be halted. Conversely, if the two hashes are equal, microprocessor 104 may boot and join a pool of trusted resources in trusted mode.

Microprocessor 104 also includes components 124, 125, and 126 to indicate whether booting from boot block 106 is allowed or authorized. Component 124 performs an evaluation on public key 108 to determine if public key 108 is a null value, such as 0. In some embodiments, a null public key may be an indication that no signature is required for booting. Public key 108 having a null value may allow booting of the chipset such as for debug purposes, without the proper signing of the boot block 106. Public key 108 may be set to null, for example, when a Joint Test Action Group (JTAG) connector is inserted in a BMC containing microprocessor 104.

If public key 108 is null, the result of the comparison 124 is a logical "1." If public key 108 is not null, then the result of the comparison 124 is a logical "0." Component 125 performs a logical OR on the result of the evaluation 120 of the two hash values 114 and 118 and the comparison 124. If either the evaluation 120 or the comparison 124 is set to logical "1" then boot indicator 126 is set to logical "1." However if neither the evaluation 120 nor the comparison 124 are set to logical "1" then boot indicator 126 is set to logical "0." Boot indicator 126 may indicate whether or not microprocessor 104 is to be booted from storage 102. Boot indicator 126 is true when storage 102 is properly signed as indicated by the evaluation 120 of the hash values or if public key 108 has a null value, indicating that proper signing is not necessary for booting.

The remaining components of microprocessor 104 may be utilized to generate a cryptographic key for accessing protected storage 150. Transform process 130 may receive fused random value (FRV) 128 and public key 108 as inputs and produce as output HRK 136. In some embodiments, receiving public key 108 may be as a result of a one-time read in order to provide better protection for public key 108 and protected storage 150. The one-time read may be performed as part of a boot process. In some embodiments, FRV 128 is a pseudo-random value that is fused into microprocessor 104 during manufacture. In some embodiments, FRV 128 is fused into a circuit board during manufacture of a circuit board that includes microprocessor 104. In some embodiments, FRV 128 is implemented on an application-specific integrated circuit (ASIC) of microprocessor 104. In other embodiments, FRV 128 is stored on an ASIC of microprocessor 104. In some embodiments, FRV 128 may be readable only by transform process 130. In some embodiments, FRV 128 may be generated by microprocessor 104 before each boot. In that case, the generation must produce the same number each time.

Transform process 130 may apply any cryptographic combining function of two variables to produce HRK 136 from inputs public key 108 and FRV 128. For example, advanced encryption standard (AES) encryption may be used where public key 108 is the data input to AES and FRV 128 is the key input to AES. AES is published by the National Institute of Standards and Technology as US FIPS PUB 197 (FIPS 197) dated 26 November 2001. The AES algorithm is based on a substitution-permutation network that does not use a Feistel network. AES encryption uses an expansion based on round keys that are derived from a cipher key. AES encryption also uses an initial round in which each byte of a state is combined with a round key using a bitwise XOR.

As another example, transform process 130 may perform a hash using FRV 128 and public key 108. Transform process 130 may, for example, append FRV 128 and public key 108 and hash the result. In other embodiments, a keyed hash of public key 108, using FRV 128 as the key, may be used. In other embodiments, simpler functions of two variables may be used. For example, HRK 136 may be produced by adding FRV 128 and public key 108, or by ANDing their bits.

In some embodiments, microprocessor 104 may generate HRK 136 as needed rather than store HRK 136 in permanent storage, such as non-volatile storage. In further embodiments, microprocessor 104 may generate HRK 136 only as part of a boot process. As a result of producing HRK 136 by combining FRV 128, which is unique to microprocessor 104, and public key 108, HRK 136 may be unique for each combination of microprocessor 104 and public key 108. Use of FRV 128 has each microprocessor 104 effectively using a different symmetric key protecting the contents of protected storage 150. Other embodiments may omit use of FRV 128 and instead use a fixed function to produce HRK 136 from public key 108.

Once HRK 136 is generated, microprocessor 104 checks at process 140 whether HRK enable 138 is true. If so, HRK 136 is sent to multiplexer 144. If not, in some embodiments, no value representing HRK 136 is sent to multiplexer 144. In other embodiments, a zero or null value may be sent. In further embodiments, process 140 may logically AND HRK 136 with HRK Enable indicator 138 and the result may be sent to multiplexer 144. When HRK Enable indicator 138 is set to logical "1," indicating that HRK 136 is enabled, the result of process 140 is applying the identity function, passing HRK 136 unchanged to AES Engine 146. When HRK Enable indicator 138 is set to logical "0," indicating that HRK 136 is not enabled, the result of process 140 is sending a NULL value to AES Engine 146, indicating that it should perform no encryption/decryption.

Another input to multiplexer 144 is programmable key 142, another cryptographic key. Programmable key 142 may be used for purposes other than accessing protected storage 150. For example, programmable key 142 may be used to encrypt/decrypt SSL traffic. The output of multiplexer 144 is transmitted to and received by an advanced encryption standard (AES) engine 146. In some embodiments, the AES 146 is implemented on an ASIC of microprocessor 104. When the result is HRK 136, AES engine 146 may use the key to access and modify protected storage 150. When the result is programmable key 142, AES engine 146 may use the other key for other purposes, such as for encrypting data to be communicated over a network. As a result, microprocessor 104 is able to swap keys in and out as needed. Further, as long as signed hash checks out as a valid signing of boot block 106 by public key 108, resulting in HRK Enable 138 having a true value, secure booting is enabled.

In authentication system 100, no exchange of secret or private keys between storage 102 and microprocessor 104 is required or performed, except the transmission of public key 108 from storage 102 to microprocessor 104. Further, various public/private keys may be used to limit the chance of a security breach as the result of an inadvertent release of a private key. In addition, microprocessor 104 may be debugged or repurposed by re-imaging the boot block 106 of the storage 102. During the course of operating system 100, verification key 108 may be changed from one value to another value (for example in a BMC as a result of a firmware update). Doing so renders any data previously stored in protected storage 150 inaccessible.

Embodiments of authentication system 100 may prevent attacks on boot block 106 and ensure that microprocessor 104 only runs code designed by the product developer. For example, suppose signature 110 is verified but the key pair used to produce signature 110 is not the original, legitimate pair that included verification key 108. This condition may obtain if an attacker attacked boot block 106, signed it with the attacker's own signing key, and replaced original verification key 108 with the attacker's verification key. In this case, the HRK produced by the process described in FIG. 1 will be the wrong value for accessing data previously stored in protected storage 150. Any data obtained from protected storage 150 as a result will be nonsense.

As another example, if the attacker changes any part of the boot block covered by the signed hash but does not replace original public key 108, then the verification of the digital signature will fail resulting in locking protected storage 150. In addition, the boot indicator may be null and prevent booting.

Changes to the boot block and corresponding changes to the boot block digital signature do not destroy secure access to storage 102 so long as public key 108 does not change, as the HRK 136 will remain the same computed value. This fact allows the boot block code to be updated by the product developer as needed. Conversely, changes to public key 108 will result in a different computed HRK 136 preventing access to previously secure data in storage 102.

An embodiment of the process of FIG. 1 in which the FRV is eliminated avoids the risks associated with generating unique keys that are hard-coded in the microprocessor 104 during the manufacturing process. Similarly, there is no need to rely on a third-party contractor to insert a key in a component it manufactures. On the other hand, if FRV 128 or some other method of generating a unique key for microprocessor 104 is eliminated, then an attack which successfully discovers HRK 136 may be able to determine the hidden root key on all microprocessors using a similar process.

Figure 2:
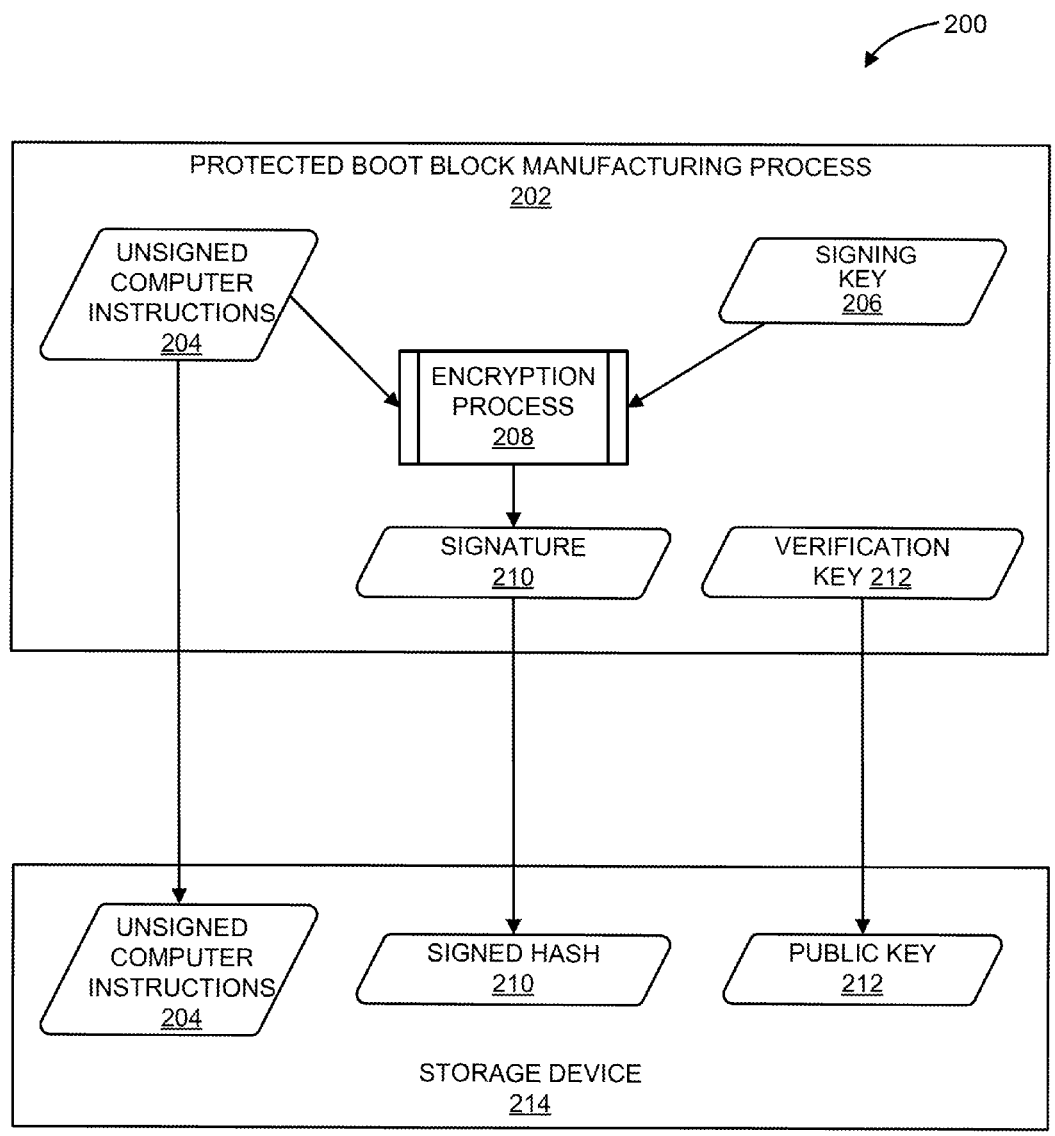
FIG. 2 illustrates a block diagram of another exemplary embodiment of an authentication system.
Figure 3:
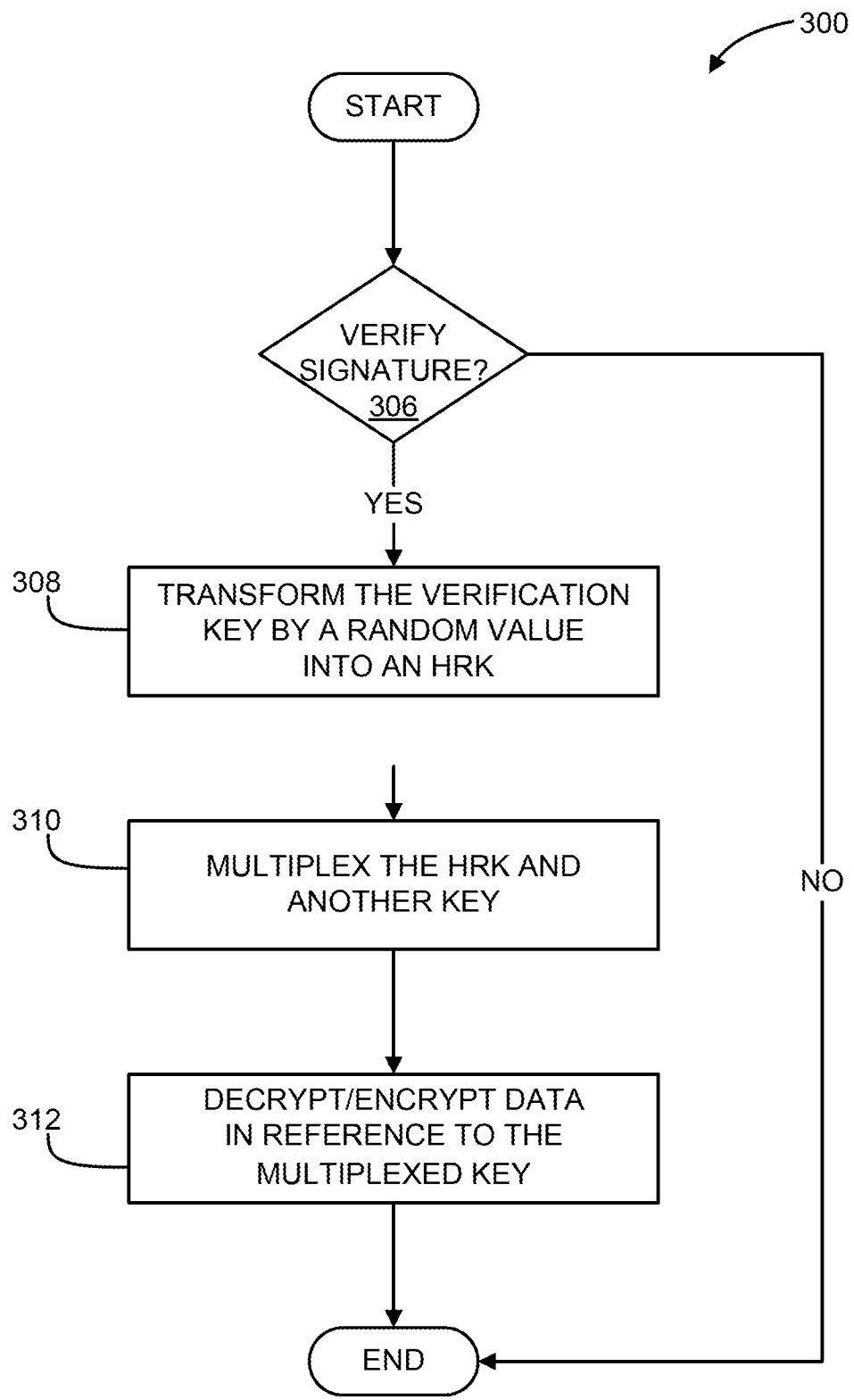
FIG. 3 illustrates a flowchart of an exemplary embodiment of a method of authentication.

FIG. 2 shows the process 200 of manufacturing a protected boot block. FIG. 2 includes protected boot block manufacturing process 202 and storage device 214. After the manufacturing process, storage device 214 may contain a protected boot block. Input to the protected boot block manufacturing process 202 includes a pair of cryptographic keys, signing key 206 and verification key 212. The input also includes unsigned computer instructions 204, which may be boot instructions. Signing process 208 uses signing key 206 and unsigned computer instructions 204 to produce digital signature 210.

Protected boot block manufacturing process 202 may then store unsigned computer instructions 204, signature 210, and verification key 212 in storage device 214. Unsigned computer instructions 204, signature 210, and verification key 212 in FIG. 2 may correspond to boot block 106, signed hash 110, and public key 108 in FIG. 1, respectively.

Method 300 includes, at block 306, verifying a signature of a boot block, such as signed hash 110 of boot block 106, by using a verification key. If the signature is not verified, method 300 may end. Otherwise, method 300 includes transforming the verification key into an HRK by using a random value, at block 308. One example of the random value is fused random value 128 in FIG. 1. The transformation may be achieved by any function which maps two values into one. In one embodiment, the verification key is encrypted using the random value as the encryption key. Method 300 includes multiplexing the HRK with another cryptographic key at block 308. A microprocessor, such as microprocessor 104, may use different keys for different purposes. When it needs to access protected storage of the storage device, a multiplexer may select the HRK. When it needs a key for another purpose, the multiplexer may select another key. The other key may be a programmable key. Method 300 also includes using the selected key to decrypt and encrypt data, at block 312. For example, an encryption engine of a multiprocessor may access encrypted data, decrypt it by means of the selected key, modify the data, encrypt the result, and place the result into storage.

Figure 4:
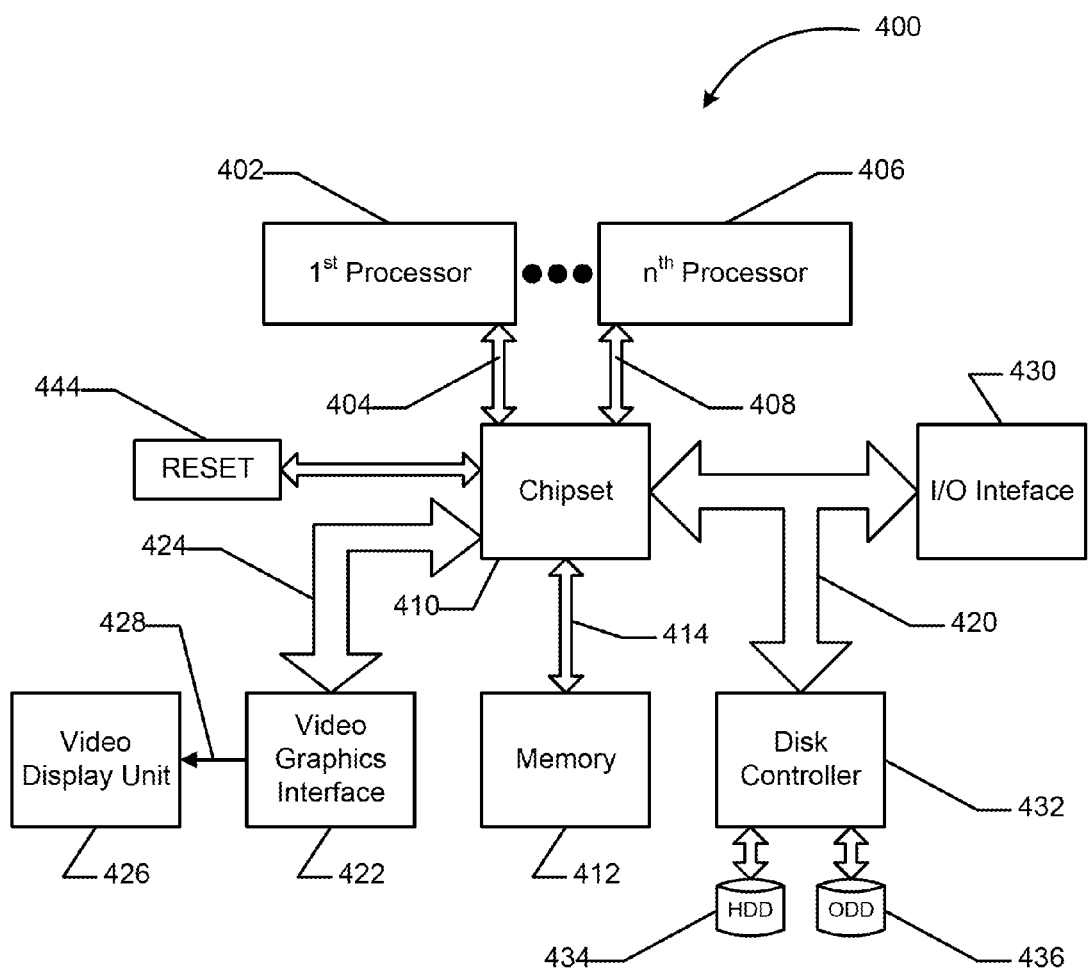
FIG. 4 illustrates a block diagram of an information handling system according to one aspect of the disclosure.

FIG. 4 illustrates a block diagram of an exemplary embodiment of an information handling system that may be a computer system such as a server. Information handling system 400 may include a first physical processor 402 coupled to a first host bus 404 and may further include additional processors generally designated as $n^{th}$ physical processor 406 coupled to a second host bus 408. Microprocessor 104 in FIG. 1 is one example of processors 402 and 406. The first physical processor 402 may be coupled to a chipset 410 via the first host bus 404. Further, the nth physical processor 406 may be coupled to the chipset 410 via the second host bus 408. The chipset 410 may support multiple processors and can allow for simultaneous processing of multiple processors and support the exchange of information within information handling system 400 during multiple processing operations.

According to one aspect, the chipset 410 can be referred to as a memory hub or a memory controller. For example, the chipset 410 may include an Accelerated Hub Architecture (AHA) that uses a dedicated bus to transfer data between first physical processor 402 and the nth physical processor 406. For example, the chipset 410, including an AHA enabled-chipset, can include a memory controller hub and an input/output (I/O) controller hub. As a memory controller hub, the chipset 410 can function to provide access to first physical processor 402 using first bus 404 and n[th] physical processor 406 using the second host bus 408 and a memory interface for accessing memory 412 using a memory bus 414. In a particular embodiment, the buses 404, 408, and 414 can be individual buses or part of the same bus. The chipset 410 can also provide bus control that handles transfers between the buses 404, 408, and 414.

According to another aspect, the chipset 410 can be generally considered an application specific chipset that provides connectivity to various buses, and integrates other system functions. For example, the chipset 410 can be provided using an Intel® Hub Architecture (IHA) chipset that can also include two parts; a Graphics and AGP Memory Controller Hub (GMCH) and an I/O Controller Hub (ICH). For example, an Intel 420E, a 415E chipset, or any combination thereof, available from the Intel Corporation of Santa Clara, Calif., can provide at least a portion of the chipset 410. The chipset 410 can also be packaged as an ASIC.

Information handling system 400 can also include a video graphics interface 422 that can be coupled to the chipset 410 using a third host bus 424. In one form, the video graphics interface 422 can be an Accelerated Graphics Port (AGP) interface to display content within a video display unit 426. Other graphics interfaces may also be used. The video graphics interface 422 can provide a video display output 428 to the video display unit 426. The video display unit 426 can include one or more types of video displays such as a flat panel display (FPD) or other type of display device. Information handling system 400 can also include an I/O interface 430 that can be connected via an I/O bus 420 to the chipset 410. Microprocessor 104 is one implementation of the I/O interface 430. The I/O interface 430 and I/O bus 420 can include industry standard buses or proprietary buses and respective interfaces or controllers. For example, the I/O bus 420 can also include a Peripheral Component Interconnect (PCI) bus or a high speed PCI-Express bus. In one embodiment, a PCI bus can be operated at approximately 66 MHz and a PCI-Express bus can be operated at approximately 428 MHz. PCI buses and PCI-Express buses can be provided to comply with industry standards for connecting and communicating between various PCI-enabled hardware devices. Other buses can also be provided in association with, or independent of, the I/O bus 420 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 410 can employ a Northbridge/Southbridge chipset configuration (not illustrated). For example, a Northbridge portion of the chipset 410 can communicate with the first physical processor 402 and can control interaction with the memory 412, the I/O bus 420 that can be operable as a PCI bus, and activities for the video graphics interface 422. The Northbridge portion can also communicate with the first physical processor 402 using first bus 404 and the second bus 408 coupled to the nth physical processor 406. The chipset 410 can also include a Southbridge portion (not illustrated) of the chipset 410 and can handle I/O functions of the chipset 410. The Southbridge portion can manage the basic forms of I/O such as Universal Serial Bus (USB), serial I/O, audio outputs, Integrated Drive Electronics (IDE), and ISA I/O for information handling system 400.

Information handling system 400 can further include a disk controller 432 coupled to the I/O bus 420, and connecting one or more internal disk drives such as a hard disk drive (HDD) 434 and an optical disk drive (ODD) 436 such as a Read/Write Compact Disk (R/W CD), a Read/Write Digital Video Disk (R/W DVD), a Read/Write mini-Digital Video Disk (R/W mini-DVD), or other type of optical disk drive. Storage 102 in FIG. 1 and the storage device 202 in FIG. 2 are examples of the HDD 434 and the ODD 436.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over a network via a network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
    a storage device including:
        boot code;
        a public cryptographic key; and
        a purported signature of the boot code by a private cryptographic key forming a public/private cryptographic key pair with the public cryptographic key; and
    an execution engine including a decryption/encryption engine, the execution engine configured to:
        determine whether the purported signature of the boot code is a result of signing the boot code with the private cryptographic key;
        in response to determining that the purported signature of the boot code is the result of signing the boot code with the private cryptographic key, execute the boot code;
        in response to determining that the purported signature of the boot code is the result of signing the boot code with the private cryptographic key, generate a hidden root key based upon combining the public cryptographic key with a fused random value hard-coded onto a device of the information handling system;
        encrypt data with the hidden root key using the decryption/encryption engine; and
        store the encrypted data on the storage device.

2. The information handling system of claim 1, wherein the execution engine is further configured to:
    access data encrypted by the hidden root key and stored on the storage device;
    again generating the hidden root key as part of a boot process;
    reading the encrypted data from the storage device; and
    decrypting the encrypted data using the again-generated hidden root key.

3. The information handling system of claim 1, wherein the execution engine is further configured to:
    boot in a non-secure mode based upon determining that the purported signature of the boot code is not the result of signing the boot code with the private cryptographic key, wherein in the non-secure mode, the execution engine is to be prevented from decrypting data encrypted by the execution engine and stored in the storage device.

4. The information handling system of claim 1, wherein the execution engine is implemented on a microprocessor, and the fused random value is fused into the microprocessor.

5. The information handling system of claim 1, wherein the execution engine is to issue an alert upon determining that the purported signature of the boot code is not the result of signing the boot code with the private cryptographic key.

6. The information handling system of claim 1, wherein the execution engine is to abort booting based upon determining that the purported signature of the boot code is not the result of signing the boot code with the private cryptographic key.

7. The information handling system of claim 1, wherein the system is included in a baseboard management controller.

8. The information handling system of claim 1, wherein the execution engine is not to store the hidden root key in non-volatile storage.

9. The information handling system of claim 1, wherein the execution engine is implemented on a microprocessor and the decryption/encryption engine is implemented on an application-specific-integrated circuit of the microprocessor.

10. The information handling system of claim 1, wherein the execution engine is to multiplex the hidden root key and a programmable cryptographic key in the decryption/encryption engine.

11. The information handling system of claim 1, wherein the execution engine is to generate the hidden root key by applying a fixed transformation to the public cryptographic key.

12. The information handling system of claim 1, wherein the execution engine is to read the public cryptographic key only as part of a boot process.

13. A method comprising:
    during a first boot process of a computing device:
        determining by the computing device whether a purported signature of first boot code by a private cryptographic key forming a public/private cryptographic key pair with a public cryptographic key is a result of signing the first boot code with the private cryptographic key, the first boot code stored in non-volatile storage;
        if the purported signature is the result of signing the first boot code with the private cryptographic key, then executing the first boot code;
        reading from the non-volatile storage the public cryptographic key;
        if the purported signature is the result of signing the first boot code with the private cryptographic key, then generating a hidden root key based upon combining the public cryptographic key with a fused random value hard-coded onto an application-specific integrated circuit of the computing device;
        encrypting by the computing device data with the hidden root key; and
        storing the encrypted data on the non-volatile storage.

14. The method of claim 13, further comprising:
    reading encrypted data from the non-volatile storage; and
    decrypting the encrypted data via the hidden root key.

15. The method of claim 13, further comprising during a second boot process of the computing device:

booting in a non-secure mode based upon determining that the purported signature of second boot code is not the result of signing the second boot code with the private cryptographic key; and preventing the computing device from decrypting the encrypted data based upon booting in the non-secure mode.

16. An information handling system comprising:
a storage device including:
  boot code;
  a public cryptographic key; and
  a purported signature of the boot code by a private cryptographic key forming a public/private cryptographic key pair with the public cryptographic key; and
an execution engine including a decryption/encryption engine, the execution engine configured to:
  determine whether the purported signature of the boot code is a result of signing the boot code with the private cryptographic key;
  in response to determining the purported signature of the boot code is the result of signing the boot code with the private cryptographic key, execute the boot code;
  in response to determining the purported signature of the boot code is the result of signing the boot code with the private cryptographic key, generate a hidden root key based upon combining the public cryptographic key with a fused random value hard-coded onto a device of the information handling system;
  access data encrypted by the hidden root key and stored on the storage device;
  read the encrypted data from the storage device; and
  decrypt the encrypted data using the hidden root key.

17. The information handling system of claim 16, wherein the execution engine is further configured to:
  encrypt the data with the hidden root key using the decryption/encryption engine; and
  store the encrypted data on the storage device.

18. The information handling system of claim 16, wherein the fused random value is fused into a circuit board of the information handling system, the circuit board comprising a microprocessor hosting the execution engine.

19. The information handling system of claim 18, wherein the fused random value is fused into the microprocessor.

20. The information handling system of claim 19, wherein the fused random value is implemented on an application-specific integrated circuit of the microprocessor.

* * * * *